United States Patent
Morimoto et al.

(10) Patent No.: US 6,940,495 B2
(45) Date of Patent: Sep. 6, 2005

(54) VARIABLE CAPACITANCE TYPE INPUT DEVICE

(75) Inventors: Hideo Morimoto, Gojo (JP); Kazuhiro Okada, Omiya (JP)

(73) Assignees: Nitta Corporation, Osaka (JP); Wacoh Corporation, Saitama (JP)

(*) Notice: Subject to any disclaimer, the term of this patent is extended or adjusted under 35 U.S.C. 154(b) by 164 days.

(21) Appl. No.: 09/778,527

(22) Filed: Feb. 7, 2001

(65) Prior Publication Data

US 2001/0011994 A1 Aug. 9, 2001

(30) Foreign Application Priority Data

Feb. 8, 2002 (JP) ....................................... 2000-030002

(51) Int. Cl.[7] .............................................. G09G 5/08
(52) U.S. Cl. .................................... 345/174; 178/18.06
(58) Field of Search .............................. 345/163, 156, 345/157, 161, 167, 173, 174; 341/20, 21, 22, 23; 200/6 A, 5 R; 463/37, 38, 36; 178/18.03, 18.06, 18.05, 18.07

(56) References Cited

U.S. PATENT DOCUMENTS

| | | | | | |
|---|---|---|---|---|---|
| 5,889,242 A | * | 3/1999 | Ishihara et al. | .............. | 200/6 A |
| 6,051,853 A | * | 4/2000 | Shimada et al. | ............. | 257/252 |
| 6,271,830 B1 | * | 8/2001 | Berstis | ......... | 341/33 |
| 6,344,618 B1 | * | 2/2002 | Sato | ........................ | 200/6 A |
| 6,356,257 B1 | * | 3/2002 | Kaneo | ........................ | 345/161 |
| 6,437,772 B1 | * | 8/2002 | Zimmerman et al. | ....... | 345/160 |

* cited by examiner

Primary Examiner—Chanh Nguyen
(74) Attorney, Agent, or Firm—Koda & Androlia

(57) ABSTRACT

A capacitance type sensor includes a substrate, a group of electrodes fixed on an upper face of the substrate, a movable electrode plate having an electrode on its lower side and a gap between the group of fixed electrodes on the substrate and the electrode on the movable electrode plate. The gap is formed with a solder layer, a conductive elastomer layer, a conductive paint layer, or a conductive adhesive material layer provided on the substrate. The electrode on the movable electrode plate is made of conductive rubber plate or conductive elastomer plate.

3 Claims, 7 Drawing Sheets

VARIABLE CAPACITANCE TYPE INPUT DEVICE

BACKGROUND OF THE INVENTION

The present invention relates to a capacitance type sensor, which specifically can be used as a joy stick or a pointing device.

The capacitance type sensor shown in FIG. 7 is developed by the inventors of the present application and a patent has been filed in Japan.

In FIG. 7, the capacitance type sensor includes a substrate 90, a movable electrode plate D, an operation part 92 and a fixing member 93. The substrate 90 has fixed electrodes Dx+, Dx−, Dy+, Dy− and Dz+ thereon. The movable electrode plate D has faces, and at least one of the faces which is opposing the fixed electrodes Dx+, Dx−, Dy+, Dy− and Dz+ is made of conductive rubber. The operation part 92 is made of silicone rubber and integrally formed with the movable electrode plate D. The fixing member 93 presses down the movable electrode plate D and the operation part 92 and prevents them from separating from the substrate 90. The fixed electrodes Dx+, Dx−, Dy+, Dy− and Dz+ and the movable electrode plate D form a plurality of variable capacitance parts Cx+, Cx−, Cy+, Cy− and Cz+, and the capacitance of each of the variable capacitance parts Cx+, Cx−, Cy+, Cy− and Cz+ changes in accordance with the magnitude and the direction of the force applied to the operation part 92.

In the above capacitance type sensor, in order to ensure a gap between the movable electrode plate D and the fixed electrodes Dx+, Dx−, Dy+, Dy− and Dz+, it is necessary to form a lower face of the movable electrode plate D in a three-dimensional manner, and this increases the manufacturing cost.

SUMMARY OF THE INVENTION

It is hence an object of the present invention to provide a capacitance type sensor which can be manufactured at a lower cost.

More specifically, it is an object of the present invention to provide a capacitance type sensor in which the movable electrode plate D does not require a three-dimentional lower face.

The capacitance type sensor of the present invention includes a substrate having a group of fixed electrodes on its upper surface and a solder layer. The thickness of the solder layer on the substrate provides a gap between the group of fixed electrodes and an electrode formed on a lower flat face of a movable electrode plate.

The capacitance type sensor of the present invention may include a substrate having a group of fixed electrodes on its upper surface and a conductive elastomer layer, a conductive adhesive material layer or a conductive paint layer which is provided on the substrate. The conductive layer of elastomer, adhesive material or paint provides a gap between the group of fixed electrodes and an electrode formed on a lower flat face of a movable electrode plate.

The electrode on the movable electrode plate of the capacitance type sensor of the present invention may be made of conductive rubber plate or conductive elastomer plate.

The above and other objects, features and advantages of the present invention will become apparent from the following description read in conjunction with the accompanying drawings.

DESCRIPTION OF THE PREFERRED EMBODIMENTS

The present invention will be described below with reference to the accompanying drawings showing preferred embodiments.

Figure 1:
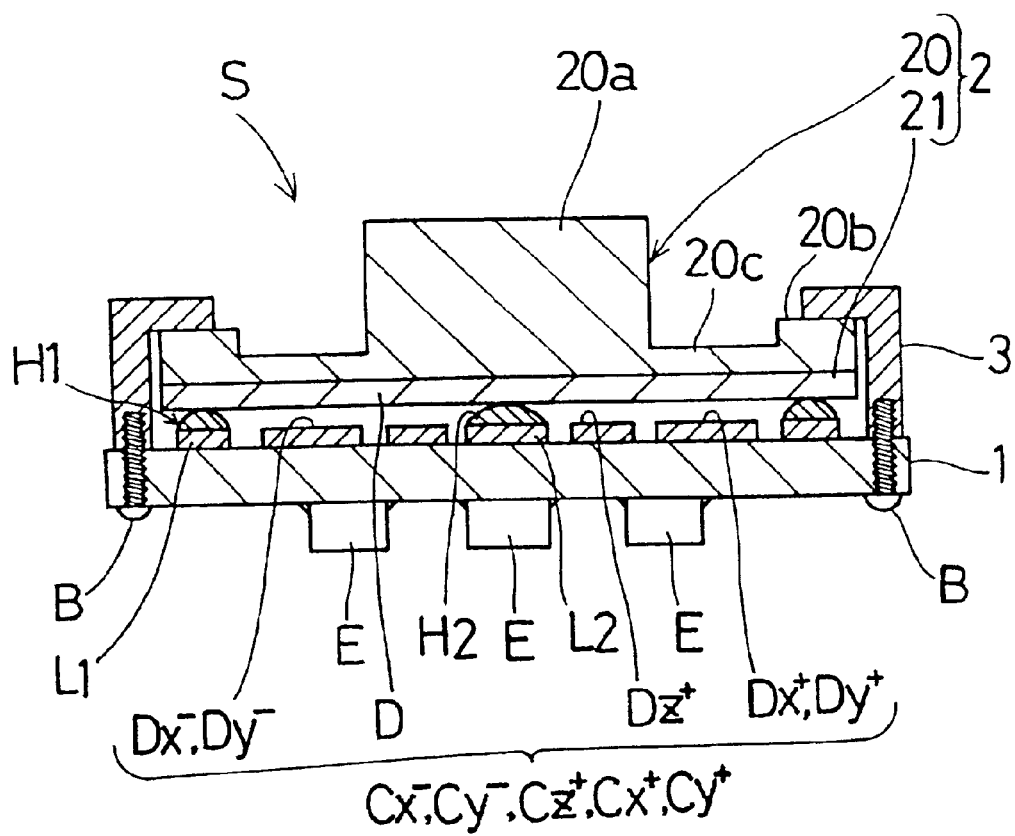
FIG. 1 is a cross-sectional view of a capacitance type sensor according to one embodiment of the present invention.

FIG. 1 illustrates a cross-sectional view of a capacitance type sensor S according to an embodiment of the present invention.

Referring to FIG. 1, the capacitance type sensor S basically includes a substrate 1 and a movable electrode plate 2 provided with a gap with respect to the substrate 1. The substrate 1 and the movable electrode plate 2 are disposed so as not to be separated from each other by a fixing member 3 attached to the substrate 1 with screws B.

The main construction of the capacitance type sensor S will be described below in detail.

Figure 2:
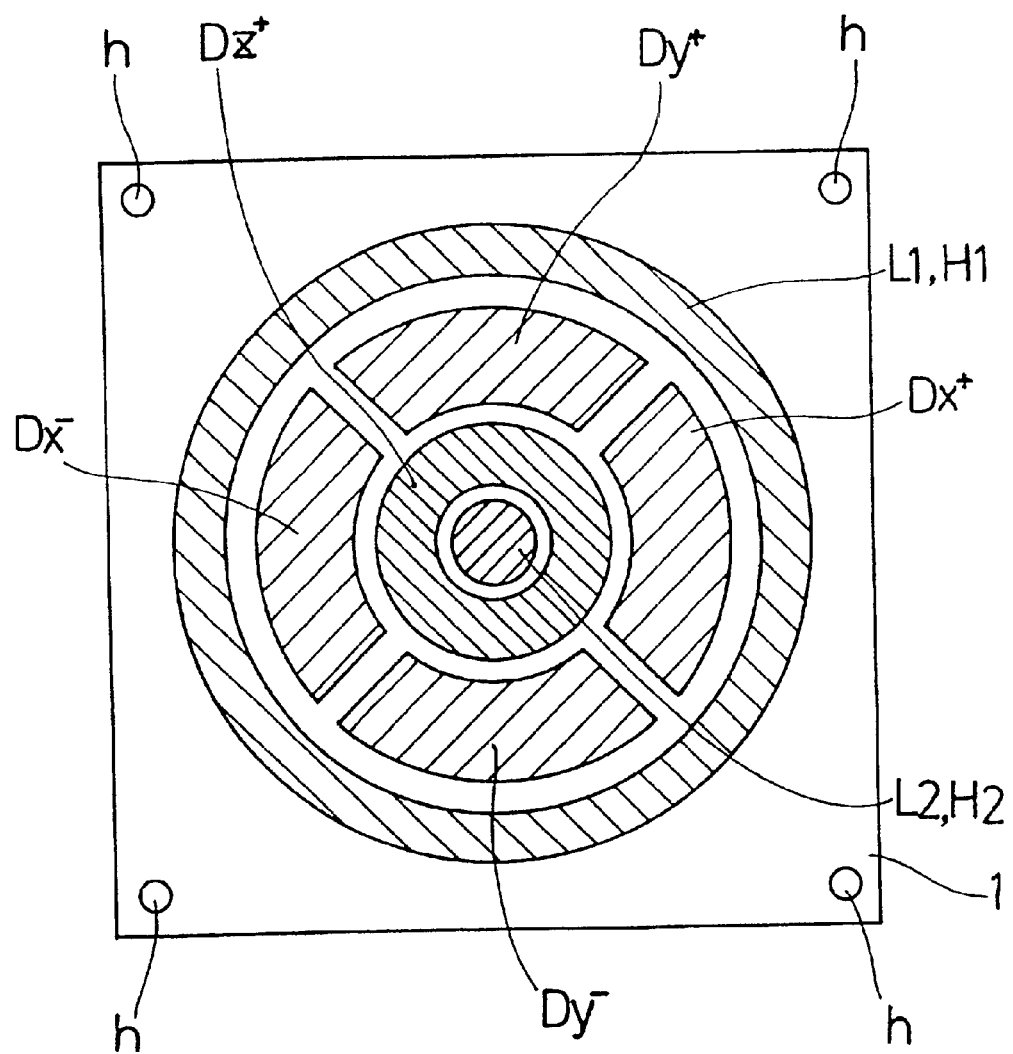
FIG. 2 is a plan view of a substrate, fixed electrodes and other elements constituting the capacitance type sensor of FIG. 1.

Referring to FIGS. 1 and 2, the substrate 1 has, on its upper face, lands L1 and L2 for contact points (contact lands) and fixed electrodes Dx+, Dx−, Dy+, Dy− and Dz+ covered with resist films (no shown). On the lower face, the substrate 1 has electronic components E for capacitance/voltage conversion. The substrate 1 further includes through-holes h in its four corners, into which the screws B are inserted. The contact lands L1 and L2 are provided on the upper faces with solder layers H1 and H2 made by way of melting an appropriate amount of solder. The fixed electrodes Dx+, Dx−, Dy+, Dy− and Dz+ are respectively covered with resist films (not shown) so as to prevent direct contact with a conductive rubber part 21 which will be described later.

The movable electrode plate 2 is as a whole made of elastic rubber. As seen from FIG. 1, the movable electrode plate 2 is composed of an upper silicone rubber part 20 and a lower conductive rubber part 21 affixed thereto. The material for the movable electrode plate 2 is a polymer substance (elastomer) that has a large rubber elasticity near an ordinary temperature including, for example, cross-liked natural rubber, synthetic rubber, thermoplastic urethane rubber, spandex, elastic polycarbonate resin, sponge rubber, and the like.

Referring to FIG. 1, the silicone rubber part 20 includes a short-shaft-shaped operating portion 20a on an upper face thereof, a circumferential projecting portion 20b at an outer circumference thereof and a circular diaphragm portion 20c between the operating portion 20a and the circumferential projecting portion 20b. The circumferential projecting portion 20b is pressed by the fixing member 3. The conductive rubber part 21 is formed by stamping out a flat plate made of conductive rubber.

The movable electrode plate 2 constitutes a strain-generating body that is deformed by concentration of stress on the diaphragm portion 20c when a force is applied to the operating portion 20a. In the assembled state as shown in FIG. 1, the portion of the conductive rubber part 21 opposing the fixed electrodes Dx+, Dx−, Dy+, Dy− and Dz+ functions as an electrode D.

Figure 3:
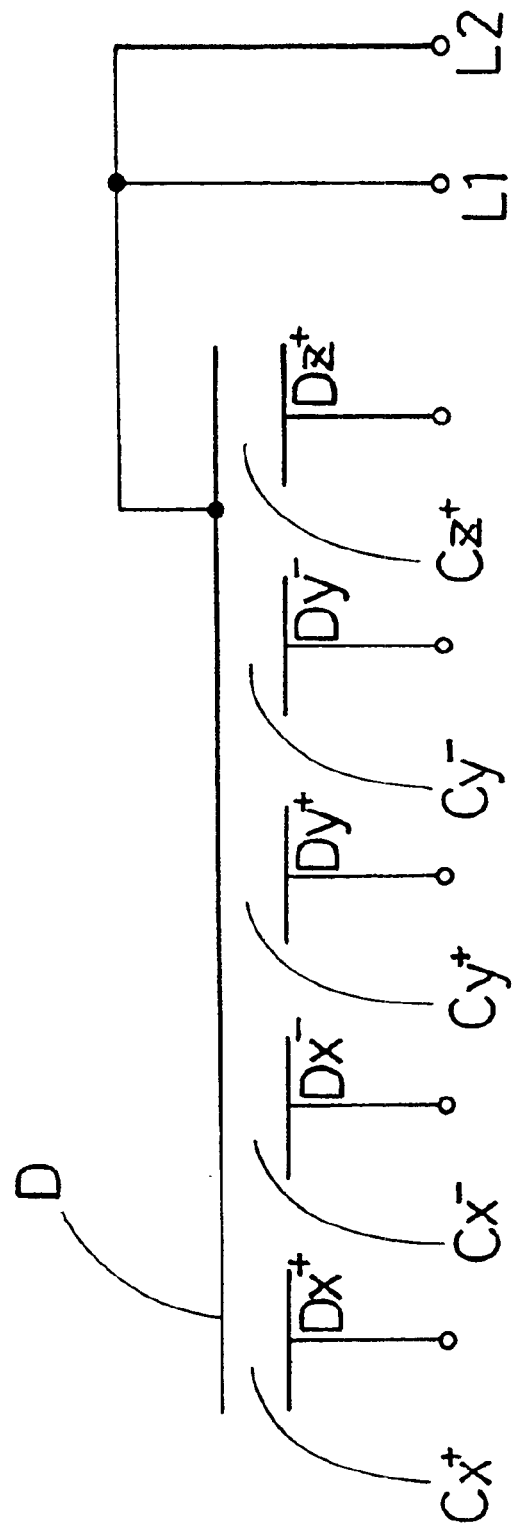
FIG. 3 is a circuit diagram of the capacitance type sensor of FIG. 1.

Furthermore, as seen from FIG. 1, the solder layers H1, H2 form a gap between the conductive rubber part 21 (the electrode D) and the fixed electrodes Dx+, Dx−, Dy+, Dy− and Dz+ formed on the substrate 1. Therefore, by setting the entire conductive rubber part 21 to be at the ground voltage by an electrical connection between the conductive rubber part 21 and the contact lands L1 and L2 through the solder layers H1 and H2, and by providing a voltage difference between the conductive rubber part 21 and the fixed electrodes Dx+, Dx−, Dy+, Dy− and Dz+, variable capacitance parts Cx+, Cx−, Cy+, Cy− and Cz+ can be formed. This is shown in the circuit diagram of FIG. 3.

The fixing member 3 is cylindrical and has an inverted L-shape in cross section so as to cover the entire circumference of the movable electrode plate 2.

With the structure as described above, the capacitance type sensor S of the present invention functions as follows by the operation of the operating portion 20a.

Figure 4:
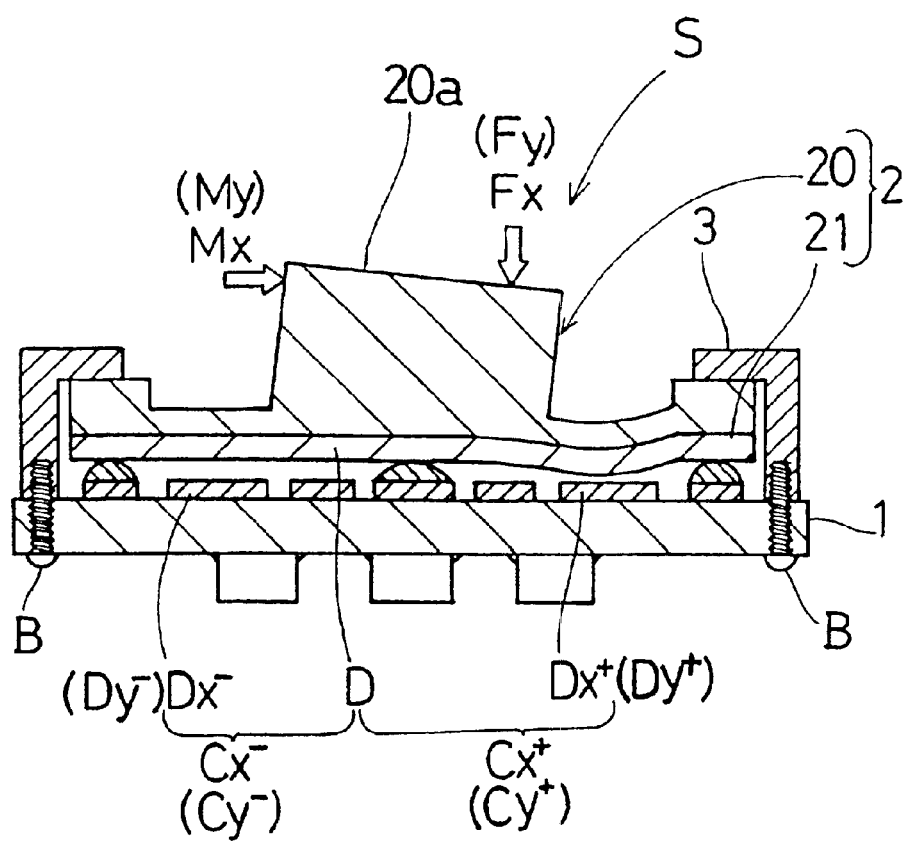
FIG. 4 is a cross-sectional view showing the state when a force or a moment in an X-axis direction is applied in an operating portion of the capacitance type sensor of FIG. 1.

First, as shown in FIG. 4, when a force Fx or a moment Mx in the X-axis direction is applied to the operating portion 20a, the gap between the electrode D and the fixed electrode Dx+ becomes smaller and the capacitance of the variable capacitance part Cx+ becomes larger. On the other hand, the gap between the electrode D and the fixed electrode Dx− remains unchanged or becomes larger, consequently the capacitance of the variable capacitance part Cx− remains unchanged or becomes smaller. When a force Fy or a moment My in the Y-axis direction is applied, by symmetry, the same holds true as to the fixed electrodes Dy+ and Dy−. In other words, in the XY-plane, the conductive rubber part 21 constituting the electrode D is deformed in accordance with the magnitude and the direction of the applied force, and accordingly the capacitances of the variable capacitance parts Cx+, Cx−, Cy+, Cy− and Cz+ change. When the aforesaid force or moment to the operating portion 20a is removed, the original state is restored.

Figure 5:
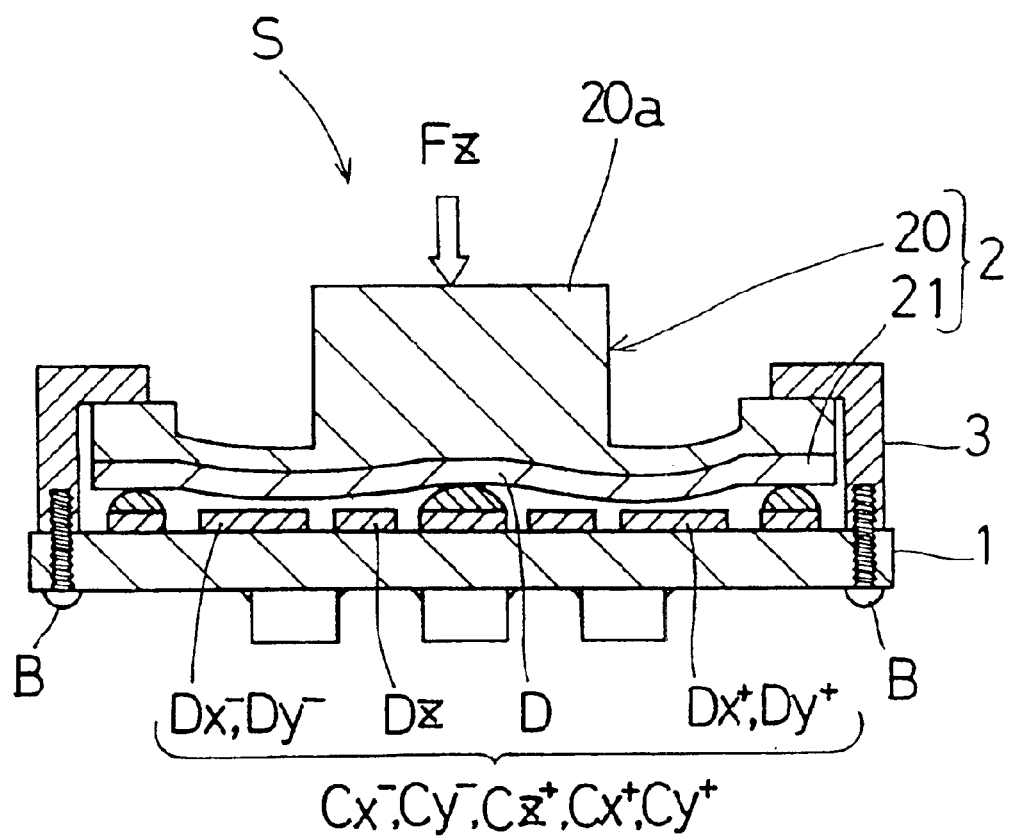
FIG. 5 is a cross-sectional view showing the state when a force in a Z-axis direction is applied in the operating portion of the capacitance type sensor of FIG. 1.

Next, referring to FIG. 5, when a force Fz in the Z-axis direction is applied to the operating portion 20a, the gap between the electrode D and the fixed electrode Dz+ becomes smaller and the capacitance of the variable capacitance part Cz+ increases. Also, the gaps between the electrode D and the fixed electrodes Dx+, Dx−, Dy+and Dy− become equally smaller, and the capacitances of the variable capacitance parts Cx+, Cx−, Cy+ and Cy− become almost equal.

Figure 6:
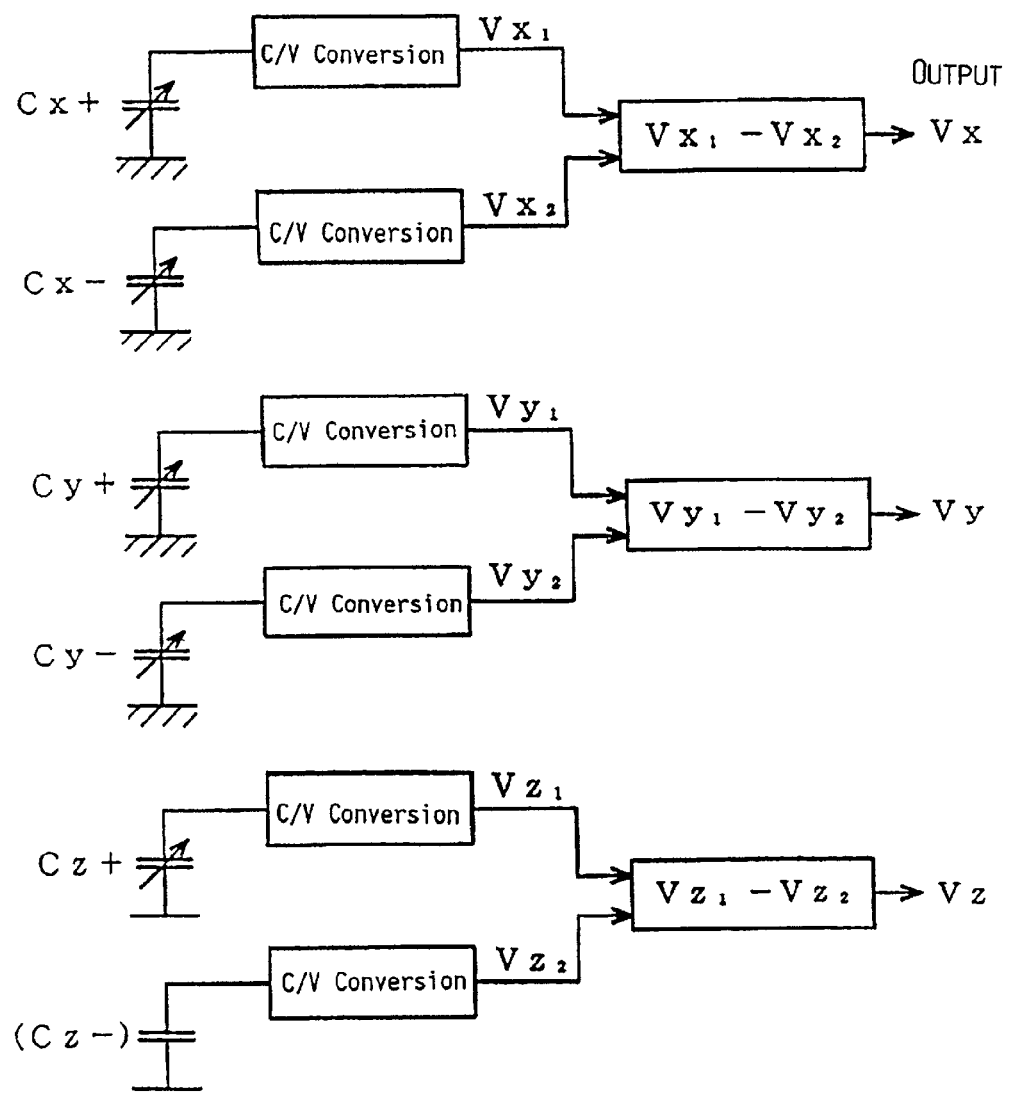
FIG. 6 is a circuit diagram for outputting capacitances, as voltages, of variable capacitance parts in the capacitance type sensor of FIG. 1.
Figure 7:
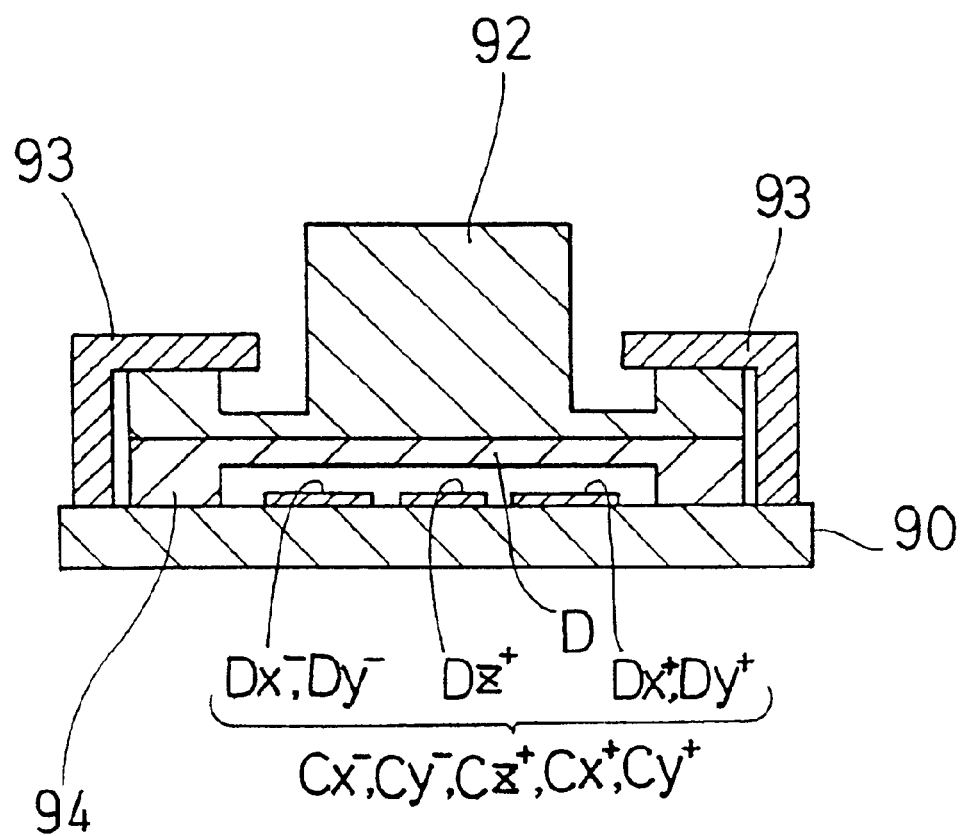
FIG. 7 is a cross-sectional view of a prior-art capacitance type sensor.

From the above, it became evident that the capacitances of the variable capacitance parts Cx+, Cx−, Cy+, Cy− and Cz+ change in accordance with the magnitude of the force applied to the three-dimensional space. Therefore, a circuit constructed as shown in FIG. 6 allows to sense the magnitude and the direction of the force applied to the operation portion 20a as a voltage change of the components in the X, Y, Z-axis directions.

As described above, the conventional sensor requires a three-dimentional configuration on the lower face of the movable electrode plate. On the other hand, in the capacitance type sensor S according to the present invention, the lower face of the movable electrode plate 2 is flat due to the presence of the solder layers H1 and H2. Therefore, the conductive rubber part 21 obtained by stamping out a flat conductive rubber plate can be employed, and thereby enhancing the productivity and improving the manufacturing cost.

Other embodiments will be described below.

The solder layers H1 and H2 in the above embodiment are provided to ensure the gap between the conductive rubber part 21 (the electrode D) and the fixed electrodes Dx+, Dx−, Dy+, Dy− and Dz+. Therefore, as long as the gap is ensured therebetween, the contact lands L1 and L2 may be omitted.

Further one of the solder layers H1 and H2 of the above embodiment may be omitted. Also, one of the solder layers H1 and H2 can be replaced with ink or paint by silk printing or the like. These embodiments can function in the same manner as described above.

The movable electrode plate 2 in the above embodiment is composed of the silicone rubber part 20 and the flat conductive rubber part 21 affixed to the lower flat face thereof. However, it is not limited thereto. The movable electrode plate 2 can be composed of the silicone rubber part 20 and a conductive ink layer provided on the lower flat face thereof.

In addition, the contact lands L1, L2 and the solders layers H1 and H2 in the above embodiment may be replaced with conductive elastomer layers, conductive paint layers or conductive adhesive material layers.

In the case where there is no need to sense the force components in three axes as in the above embodiment, it is sufficient to form a electrode or electrodes only corresponding to an axis or axes in need on the substrate 1.

As seen from the above description, the present invention does not require a three-dimentional configuration on the lower face of the movable electrode plate, and this enables to manufacture capacitance type sensors at a low cost.

Having described preferred embodiments of the invention with reference to the accompanying drawings, it is to be understood that the present invention is not limited to those precise embodiments, and that various changes and modifications may be effected therein by one skilled in the art without departing from the scope or spirit of the invention as defined in the appended claims.

What is claimed is:

1. A capacitance type sensor comprising:
    a substrate;
    a group of fixed electrodes provided on an upper face of said substrate;
    a movable electrode plate having an electrode on a lower face thereof, said movable electrode plate having a rubber elasticity; and wherein
    said substrate is provided with at least a layer of one of conductive elastomer, conductive paint and conductive adhesive material, said layer having a thickness in which said layer supports said movable electrode plate and said thickness of said layer provides a gap between said group of fixed electrodes on said substrate and said electrode on said movable electrode plate.

2. A capacitance type sensor according to claim 1, wherein said electrode on said movable electrode plate is made of one of conductive rubber plate and conductive elastomer plate.

3. A capacitance type sensor according to claim 1, wherein said movable electrode plate is set at a ground voltage.

* * * * *